Jan. 23, 1923.
R. P. BROWN.
ELECTRIC SIGNALING AND CONTROLLING APPARATUS.
FILED JULY 20, 1918.

INVENTOR
Richard P. Brown
BY
Chambers & Hubbell
his ATTORNEYS

Patented Jan. 23, 1923.

1,443,165

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

ELECTRIC SIGNALING AND CONTROLLING APPARATUS.

Application filed July 20, 1918. Serial No. 245,851.

*To all whom it may concern:*

Be it known that I, RICHARD P. BROWN, a citizen of the United States of America, and resident of the city and county of Philadelphia, in the State of Pennsylvania, have invented certain new and useful Improvements in Electric Signaling and Controlling Apparatus, of which the following is a true and exact description, reference being had to the accompanying drawings, which form a part thereof.

The general object of my present invention is to provide improved apparatus for measuring an electrical condition and for selectively actuating devices accordingly as the electrical condition measured varies in one direction or the other from a predetermined normal. The devices thus actuated may consist of, or control indicating means for, exhibiting the character of the variation from normal, or may consist of or actuate adjusting means tending to restore the electrical condition measured to its normal value on variations therefrom, or may consist of or actuate both indicating and adjusting means.

Though not necessarily limited to such use, my invention was primarily devised for use for controlling furnace conditions, in installations in which the furnace temperature is measured by means of a thermo-electric device, such as a thermo-couple and a meter responsive to the temperature variations in said thermo-electric device. Associated with this meter is a selective relay actuated in one way when the current measured by the meter falls below a predetermined normal, and in a different way when the current exceeds the normal, and preferably is actuated in a third way when the current measured by the meter is of the normal intensity. The selective relay is employed to operate furnace control elements which may be simple indicating devices from the showing of which the furnace may be directly controlled as by the manipulation of manual control valves or switches or may be automatic temperature adjusting devices, or which may comprise both signaling and automatic temperature adjusting devices. Advantageously, the relay and the meter are intermittently connected and disconnected by a time controlled switch mechanism, and in many cases I find it advantageous to employ a single meter with the thermo-electric devices of a plurality of furnaces each having its own thermo-electric device. In this case I preferably provide a separate selective relay for each furnace, and a time controlled switching mechanism for successively connecting the meter to the thermo-electric devices and selective relay for each of the various furnaces in regular order.

My invention comprises combinations and arrangements adapted to accomplish the results or purposes above specified, and novel features of construction of various parts or elements entering into said combinations or arrangement.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of my invention.

Figure 1:
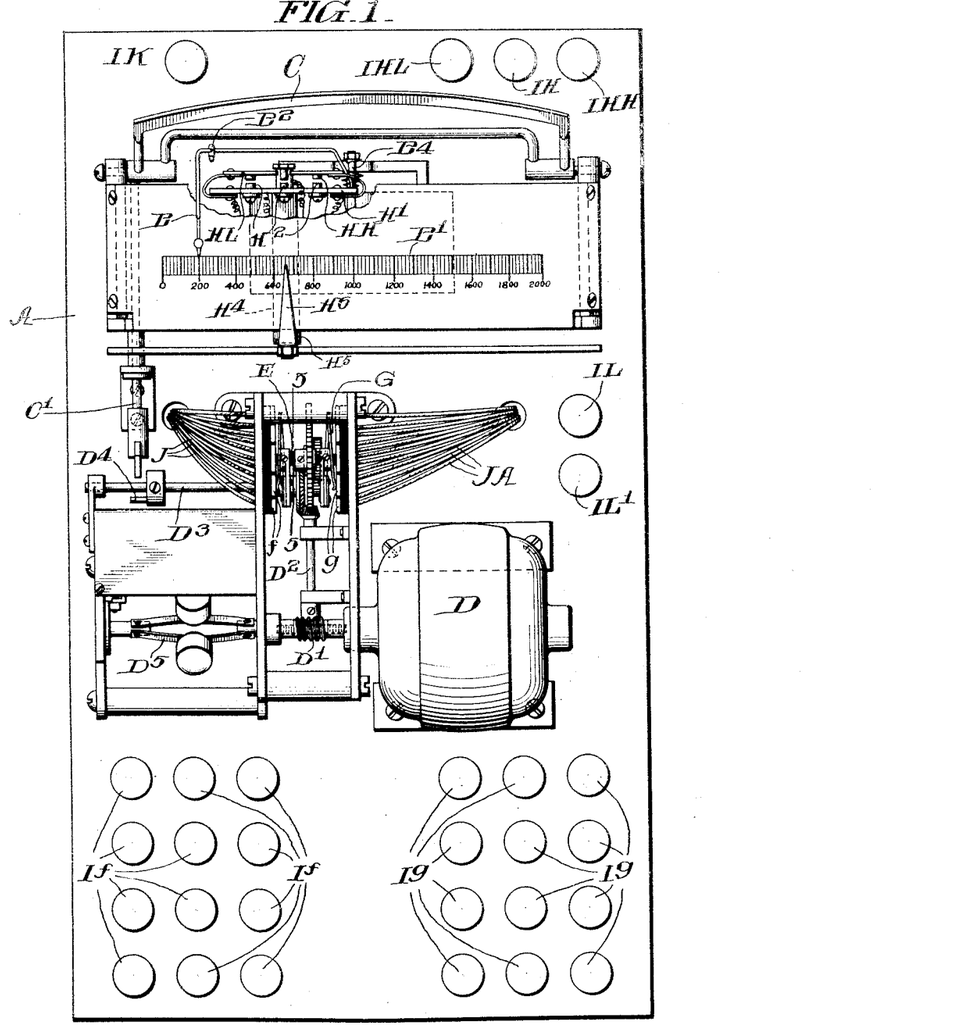
Figure 1 is an elevation, with parts broken away and removed, of the meter proper and the time controlled switching mechanism immediately associated therewith.

The apparatus shown in Fig. 1 comprises a base A on which is mounted an electric meter. The meter is of a well known type embodying nothing now novel with me, and comprises a movable element mounted in bearings of which $B^4$ is the upper bearing. The movable element comprises a winding indicated at $B^3$ in Fig. 2, but not shown in Fig. 1, and an index B. The latter has its outer end down turned to sweep over a cylindrical scale $B'$ coaxial with the movable element of the meter. Pivotally mounted in the meter frame is a depressor C, which, when swung downward, engages the index B, or rather a part $B^2$, carried by the latter to depress the latter into engagement with a contact mechanism, which, as shown, comprises an upper central normal temperature contact H, and high and low temperature contacts HH and HL, respectively, on opposite sides of the central contact. The contacts H, HH and HL are resiliently supported on, but are electrically insulated from a base contact $H'$. The latter is provided on its upper side with three contact studs $H^2$. When the depressor C is actuated, one or another of the contact studs $H^2$ is engaged by whichever of the contacts H, HH or HL above it is then engaged by the index part $B^2$. As shown, the contact plate $H'$ is carried by a post $H^4$ mounted on an arm $H^5$, which is pivoted coaxially with the movable element of the meter, and carries an index $H^6$ in cooperative relation with the scale $B'$. By angularly adjusting the arm $H^5$, the position of the contacts H, HH and HL is correspondingly adjusted. The temperature at which the part $B^2$ will engage the normal temperature contact H is indicated by the position of the index $H^6$ along the scale $B'$. The depressor C is actuated by means of a connecting rod $C'$ connected thereto and intermittently engaged by a crank pin $D^4$, carried by a rotating shaft $D^3$. In so far as above described the meter proper and the contact mechanism associated therewith in so far as it has already been described, is of a well known type embracing nothing now novel with me, and need not be described or illustrated in greater detail.

The shaft $D^3$ is operated by a suitably controlled timing mechanism, which, as shown, comprises an electric motor D, equipped with a suitable speed controlling mechanism including a ball governor $D^5$. As shown, the shaft $D^3$ is driven by beveled gears from a shaft $D^2$ carrying a worm wheel in mesh with the worm $D'$ carried by the shaft of the motor D. The motor D also drives a shaft E through the shaft $D^2$ and speed reducing gearing. The shaft E carries a pair of flexible contactor bridging devices F and G. The contact F serves to successively connect the various contacts $f$, arranged in a circular series about an annular contact $fa$ to the latter in regular succession as the shaft E is rotated. As shown, the bridging device F is bifurcated with its two end portions $F'$ engaging, one the central annular contact $fa$, and the other the series of contact segments $f$. The bridging device G is similar to the device F, and its flexible divided ends $G'$ similarly connect an annular contact $ga$ to one or another of the surrounding series of contacts $g$.

The instrument base also carries binding posts IK, IH, IHH, IHL, IL, IL', twelve binding posts IF, and twelve binding posts IG. In the furnace system illustrated in Fig. 2, in which the meter and switch mechanism shown in Fig. 1 are employed, there are twelve thermo-electric devices K, each shown as a thermo-couple, and each intended to respond to the temperature of a corresponding one of a set of twelve furnaces. One terminal of each of the thermo-couples K is connected by a corresponding individual lead $K'$ to a corresponding one of the instrument binding posts I$f$. The opposite terminal of each of the thermo-couples K is connected by a common lead $K^3$ to the instrument binding post IK. One terminal of the winding $B^3$ of the movable element of the meter is also connected to the binding post IK. The other terminal of the winding $B^3$ is connected to the annular contact $fa$. There are twelve contacts $f$ and each is individually connected to a corresponding one of the binding posts I$f$.

Figure 2:
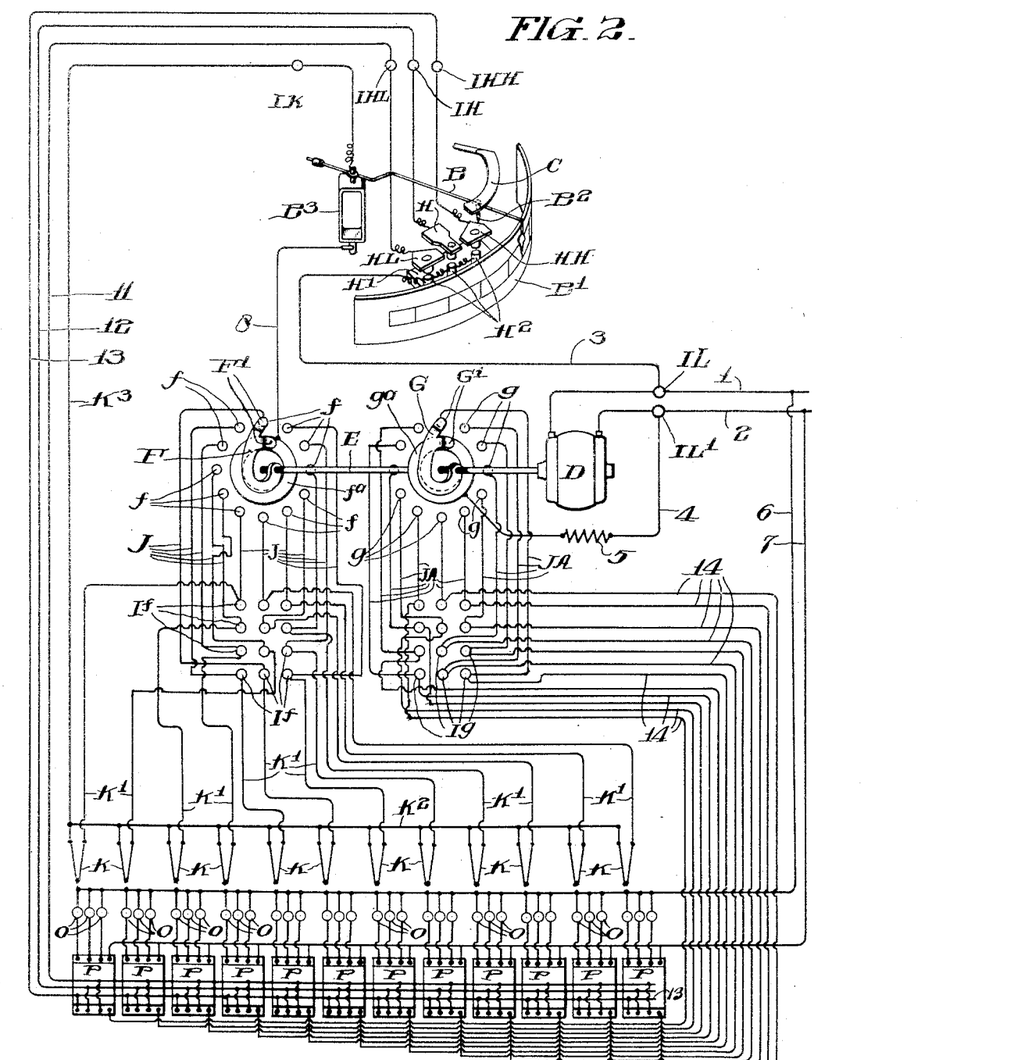
Figure 2 is a diagram of the electrical connections of a furnace system in which the meter shown in Fig. 1 is associated with a plurality of thermo-couples, each individual to a corresponding one of a plurality of furnaces and with a corresponding plurality of selective relays each actuating a high, low and normal furnace temperature indicator.
Figure 3:
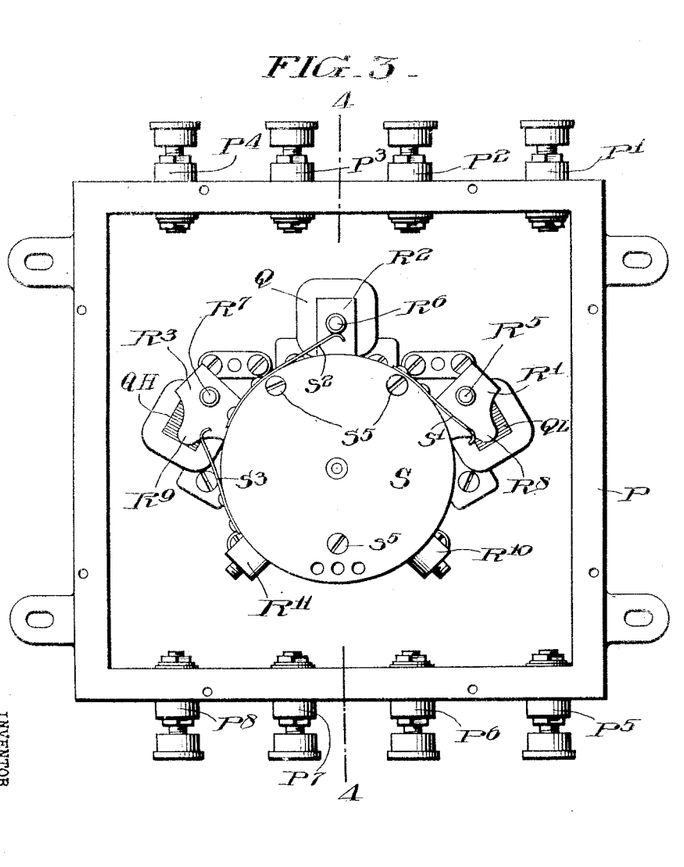
Figure 3 is a plan view of the selective relay employed in Fig. 2 with the cover of the relay removed.
Figure 4:
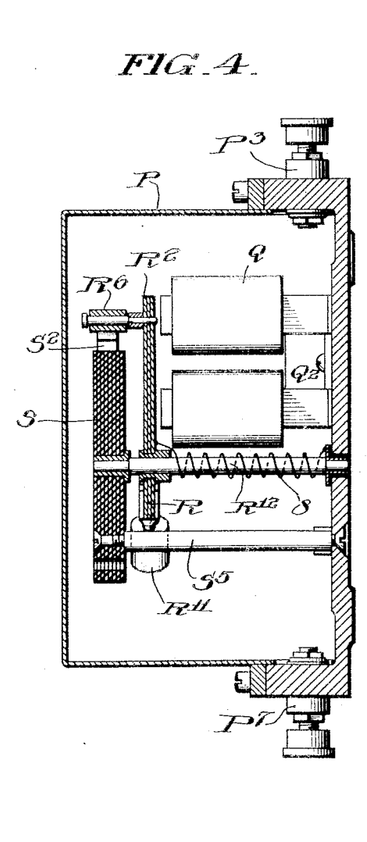
Figure 4 is a section on the line 4—4 of Fig. 3.
Figures 5, 6:
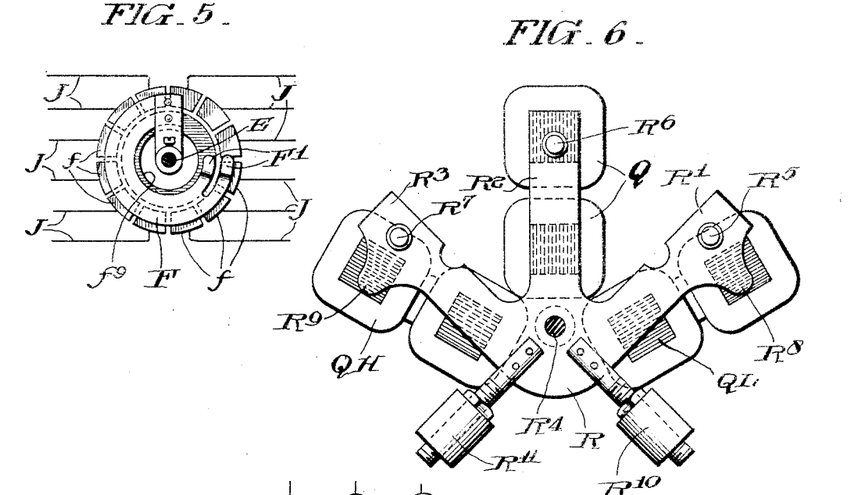
Figure 5 is a partial section on the line 5—5 of Figure 1.
Figure 6 is a sectional plan of a portion of the relay shown in Figs. 3 and 4.

In consequence, during each rotation of the shaft E, the winding of the movable element of the meter is successively connected to the terminals of each of the twelve thermo-couples K. When the meter is thus connected to any one of the plurality of thermo-couples K, the position then assumed by the index B will be a measure of the temperature in the furnace with which the corresponding thermo-couple is associated. The shafts $D^3$ and E are rotated in such timed relation that the depressor C will engage the projection $B^2$ on the index B, and depress the latter once during each interval in which the meter is connected with each of the various thermo-couples. When the index B is thus depressed, the projection $B^2$ will engage the central contact H or the side contacts HH and HL, according as the corresponding furnace temperature is equal to, exceeds, or falls, below, respectively, the predetermined temperature indicated by the index $H^6$ for which the arm $H^5$, and the contact mechanism supported by it, are set.

The contacts H, HH and HL are connected to the binding posts IH, IHH and IHL respectively. The contact studs $H^2$ of the lower contact member H are connected by a conductor 3 to the binding post IL. The binding posts IHL, IH and IHH are connected by conductors 11, 12 and 13, respectively, to the corresponding terminals ($P^6$, $P^7$ and $P^8$ respectively in Fig. 7) of each of a plurality of selective relays P, of which there is one for each furnace unit and corresponding thermo-couple K. A fourth terminal $P^5$ (see Fig. 7) of each relay P, is connected by an individual conductor 14 to a corresponding one of the binding posts Ig. Each of the binding posts Ig is also connected by an individual conductor JA to a corresponding one of the circular series of contacts g. The annular contact ga is connected by a conductor 4, which may include a suitable resistance 5, to the binding posts IL'. The binding posts IL and IL' are connected to a cooperative pair of electric current supply lines 1 and 2. The terminals of the motor D are connected to the binding posts IL and IL'.

With the circuit connections described, during each rotation of the shaft E, the terminal $P^5$ of each of the relays P is connected momentarily to the line conductor 2 through a circuit comprising the conductor 4, contact ga and the corresponding contact g, conductor JA, binding post Ig, and conductor 14. The bridging devices F and G are so relatively connected to the shaft E that when the binding post $P^5$ of any particular relay P is thus connected to the line conductor 2, the thermo-couple K, associated with the same furnace as that relay, is connected to the terminals of the meter coil $B^3$, and, in consequence, one of the terminals $P^6$, $P^7$ or $P^8$ of the same relay P will then be connected to the supply conductor 1 through the conductor 3, contact plate H', and whichever of the movable contacts HL, H or HH is then depressed by the index part $B^2$, and through the corresponding binding post IHL, IH or IHH, and conductor 11, 12 or 13.

Each of the selective relays P (see Figs. 3, 4, 6 and 7) comprises three stationary electromagnets Q, QH and QL, having U shaped cores. Associated with the electromagnets Q, QH and QL is an oscillating armature R, which is journalled to turn about a shaft $R^{12}$ and comprises three arms R', $R^2$ and $R^3$ cooperating with the three magnets QL, Q and QH, respectively. When one of the electromagnets QL, Q and QH is energized the armature moves into the position in which the corresponding armature arm R', $R^2$ or $R^3$ lies immediately above the core of the energized electromagnet. To insure that the armature will thus be caused to instantly and positively assume a position when any one of the electromagnets Q, QH and QL is energized, which is different from the position assumed by the armature when any other electromagnet is energized, I advantageously arrange the magnets QL, Q and QH with the center planes of their cores radial to a common axis, and arrange the armature arms R', $R^2$ and $R^3$ radially, as shown, but spaced slightly closer together than the radially arranged electromagnets, and I locate the supporting shaft $R^{12}$ for the armature not coaxial with the line to which the central planes of the different electromagnets are radial, but between that line and the center of the central electromagnet Q. Advantageously also the outside armature arms R' and $R^3$ are provided at their outer edges with projections or spur portions $R^8$ and $R^9$ respectively, which are in close proximity to the cores of the electromagnets QL and QH respectively when the armature is in the position assumed by it when the magnets QH or QL are energized. The maximum oscillation of the armature R is limited by the engagement of the armature arms with the posts $S^5$.

The armature R carries contacts $R^5$, $R^6$ and $R^7$ engaging stationary resilient contacts S', $S^2$ and $S^3$, respectively, accordingly as the electromagnets Q, QL or QH are energized. The contacts S', $S^2$ and $S^3$ are shown as springs supported at the periphery of a disc S of insulating material, rigidly supported by posts $S^5$. Advantageously the armature R is provided with counter balancing weights, adjustable along radial lines transverse to one another, thus making it possible to put the armature as a whole in very perfect balance about its axis of oscillation, so that the operation of the relay is independent of the position in which the relay is disposed.

Figure 7:
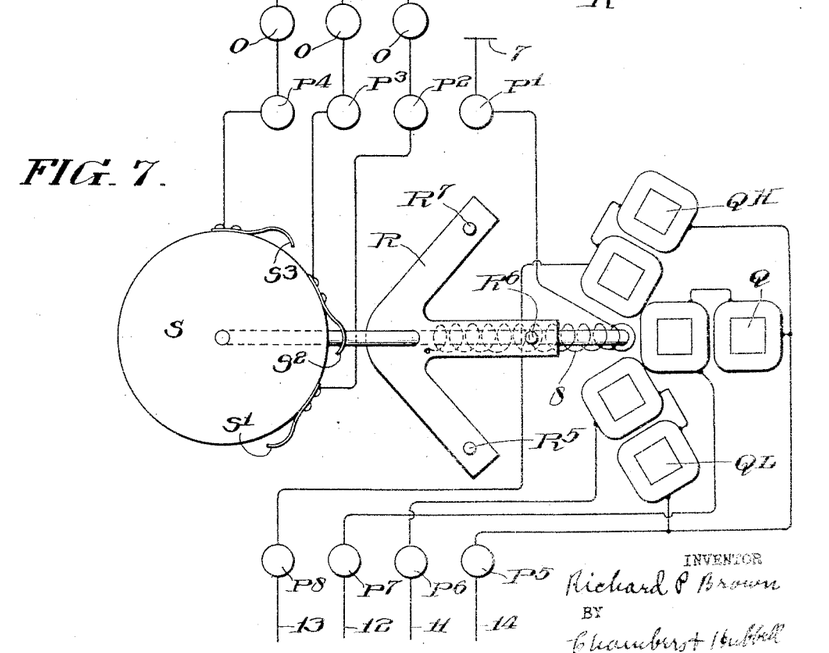
Figure 7 is a diagram illustrating the circuit connections of one of the selective relays.

One terminal of the windings of each of the electromagnets Q, QL and QH is connected to a binding post $P^5$ of the relay (see Fig. 7). The windings of the electromagnets Q, QL and QH have their second terminals connected respectively to the binding posts $P^6$, $P^7$ and $P^8$. The contacts $R^5$, $R^6$ and $R^7$, carried by the armature R, and shown as electrically connected to the latter, are connected to the binding post P' of the relay through a conductor, including a flexible portion H coiled loosely about the shaft $R^{12}$, and connected at one end to the binding post P', and at the other end to the body of the armature R. The contacts S', $S^2$ and $S^3$ are separately connected by suitable conductors to the relay binding posts $P^2$, $P^3$ and $P^4$. The binding post P' of the different relays are connected to the line conductor 2 by a common branch conductor 7. The binding posts $P^2$, $P^3$ and $P^4$ are connected to the supply conductor 1 through a circuit portion, including as shown an individual lamp or other indicating device O for each of these binding posts, and a common conductor 6.

From the description and explanation already made it will be apparent that whenever any particular thermo-couple K is connected to the meter winding $B^3$, the switch G will be in position to energize the terminal $P^5$ of the corresponding relay P from the line conductor 2. At the same time one or another of the terminals $P^6$, $P^7$ and $P^8$ of the same relay P will be energized from the line conductor 1 through the engagement of the corresponding switch contact H, HH or HL with the stationary contact H'. When the terminals $P^5$ and $P^7$ of any relay P are thus energized by the depression of the normal temperature contact H, the electromagnet Q of the relay, is energized and the armature R is caused to assume its intermediate position shown in Figs. 3, 6 and 7. In this position of the armature R, the contact $R^6$ engages the contact spring $S^2$ and thereby closes a circuit, including the central lamp or other indicating device O, of the three indicating devices O for the corresponding furnace. This indicates that the furnace temperature is normal. When, however, the depression of the contact HH energizes the relay terminal $P^8$, the electromagnet QH is energized and the armature R turns into the position in which the switch contact $R^7$ engages the contact spring $S^3$, thus energizing the left hand lamp or indicating device O of the group of indicating devices O for the corresponding furnaces, and thereby indicates that the temperature of the furnace is above normal. Similarly when the contact HL is depressed and the terminal $P^6$ of the corresponding relay is energized, the armature R swings into the position in which the contact $R^5$ engages the spring contact S', and thus energizes the right hand lamp or indexing device O of the corresponding group of indicators O for the corresponding furnace. It will be understood that in practice the lamps of other indicating devices O for each furnace will ordinarily be located, each adjacent the corresponding furnace or adjacent the switch or valve mechanism by which the temperature of that furnace may be adjusted by the attendant regulating the operation of the furnace.

Figure 8:
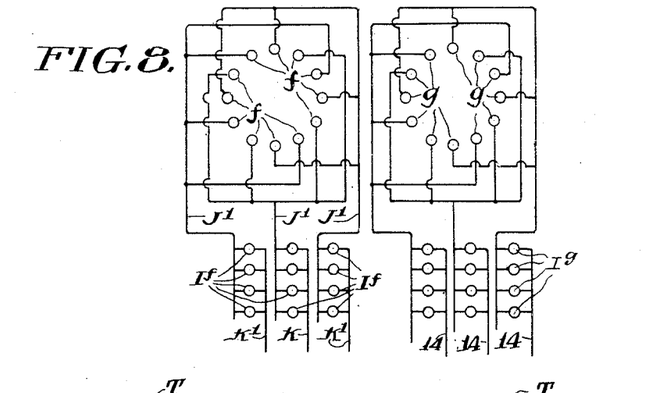
Figure 8 is a diagram illustrating a modification of a portion of the circuit arrangement shown in Fig. 2.

The apparatus hereinbefore illustrated and described is adapted for use in a furnace system comprising twelve different furnace units each with its individual relay P, its individual thermostat K, and its individual set of indicating devices O. It is obvious, however, that a single meter may be arranged to operate with a greater or lesser number of furnaces. With the particular instrument shown it is, of course, possible to operate with any number of furnaces less than twelve by simply disconnecting a corresponding number of relays and indicating devices. Where it is desired to operate the particular apparatus shown in conjunction with a number of furnaces substantially less than twelve the circuit connections may be changed if desired, so that each revolution of the shaft E will cause a plurality of measurements of the temperature of each furnace to be made and exhibited. For example, as illustrated in Fig. 8, when but three furnaces are employed, one terminal of each of the thermo-couples K' may be connected to a corresponding group of four of the binding posts I$f$, and each group of four binding posts I$f$ thus connected to one thermo-couple are connected to four of the contacts $f$ spaced at 90° apart about the shaft E. With this arrangement the conductors 14 from the terminals $P^5$ of the three relays P are similarly connected each to four binding posts I$g$, and the binding posts I$g$ are connected to the contact studs $g$ in the same order as the binding posts I$f$ and contacts $f$ are connected.

When a single furnace is in use there is then no need for the switches F and G as conductor K' from the thermo-couple of the furnace might be directly connected to the lower terminal of the meter winding $B^3$ and the conductor 4 be directly connected to the terminal $P^5$ of the relay 5. The same result can be obtained, however, with the switches F and G left in operation and without disturbing any of the internal connections of the apparatus mounted on the base A by merely connecting the conductor K' running from the thermo-couple to all of the binding posts I$f$, and at the same time, connecting the conductor 14 running from the terminal $P^5$ of the relay P to all of the binding posts I$g$.

Figures 9, 10:
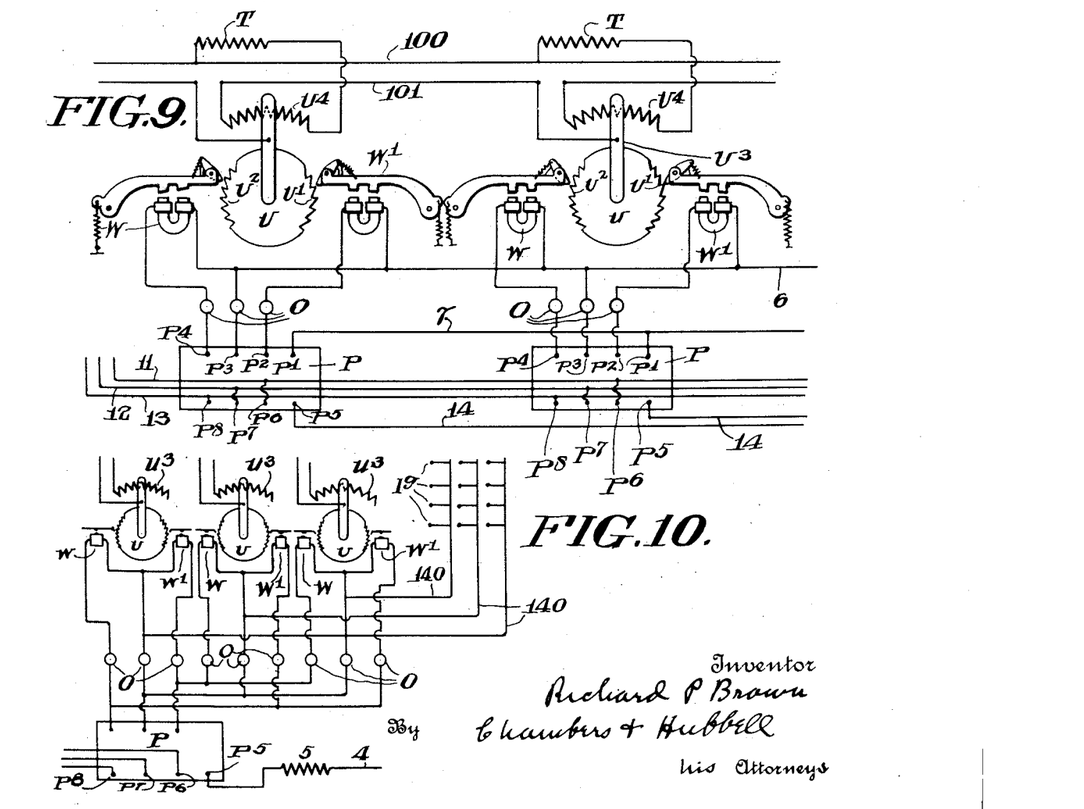
Figure 9 is a diagram illustrating an addition to the apparatus shown in Figure 2.
Figure 10 is a diagram illustrating modification of the apparatus shown in Fig. 9.

As already stated, each relay P in lieu of, or in addition to, actuating a simple temperature indicating device, may operate furnace temperature adjusting means. In Fig. 9 I have illustrated a modification of the apparatus shown in Fig. 2, in which means are provided for automatically adjusting the temperature of a furnace as required to maintain a predetermined normal temperature therein. The arrangement shown in Fig. 9 is one in which the various furnaces are electric furnaces with separate heating resistances T for the different furnaces. One terminal of each resistance T is directly connected to a supply conductor 100, while the other terminal of the resistance T is connected to a resistance $U^4$ of a rheostat. More or less of this resistance U⁴ may be cut into or out of circuit with the corresponding furnace by turning the rheostat switch arm $U^3$, which is connected to the cooperating supply conductor 101. The arm $U^3$ is shown as connected to and adapted to turn with a disc having two sets of oppositely inclined ratchet teeth $U'$ and $U^2$. The armature of an electromagnet W carries a pawl adapted to engage the ratchet teeth $U^2$ and thereby imparts a limited counter clockwise movement to the switch arm $U^3$ each time the electromagnet W is energized. Similarly the pawl carried by the armature of the electromagnet W' engages the ratchet teeth $U'$ and imparts a clockwise rotation to the rheostat switch arm $U^3$, when the magnet W' is energized. The arrangement is such that when either of the electromagnets W, W' is deenergized, the pawl carried by its armature clears the corresponding set of ratchet teeth so that backward movement of the latter is then permitted. The winding of each electromagnet W is connected in series with the corresponding high temperature indicator O between the conductor 6 and the corresponding relay terminal $P^4$. The winding of the electromagnet W' is connected in series with the corresponding low temperature indicator O between the conductor 6 and the terminal $P^2$ of the corresponding relay P. Aside from this the circuit connections of the complete apparatus of which Fig. 9 represents a portion may be the same as that of the arrangement shown in Fig. 2. With this arrangement whenever the apparatus indicates that the temperature of a particular furnace is above or below normal a portion of the corresponding resistance $U^7$ is cut into or out of circuit.

In lieu of employing an individual relay P for each furnace a single relay P may be employed with a plurality of furnaces by transferring the switch mechanism G, and associated parts, from the circuits connecting the terminals $P^5$ of the plurality of relays to the supply conductor 2, as shown in Fig. 2, to the circuits connecting the signaling device O, or other indicating or controlling devices, to the supply conductor 1. One arrangement in which this is done is illustrated in Fig. 10 in which there are shown controlling rheostats U, and sets of indicating lamps O for three furnaces. The high temperature signaling device O and electromagnet W, for each of the three furnaces, is connected to the terminal $P^4$ of a single relay P. One end of each of the circuits, including the normal temperature indicator O of the different furnaces, is connected to the terminal $P^3$ of the single relay P, and one end of each of the circuits, including the low temperature indicator O and winding of electromagnet W' of the furnaces is connected to the relay terminal $P^2$ of the single relay P. The opposite ends of the three circuits, including the three indicators O, and the windings of the electromagnets W and W' for each terminal $P^2$, $P^3$ and $P^4$ are connected by a corresponding conductor 14 to the corresponding group binding posts Ig. The three conductors 140 are connected, as shown in Fig. 10, each to a different set of four binding posts Ig in the same manner as the three conductors 14 are connected to the binding posts Ig in Fig. 8.

It will be apparent, of course, that in the apparatus shown in Figs. 9 and 10, the lamps and like indicating devices O, may be dispensed with. When this is done the electromagnet Q becomes idle, and so far as this particular use of the apparatus is concerned, may be omitted from the relay P. Its presence, however, does not interfere with the operation of the apparatus.

The use of a single relay P, in place of a plurality of such relays, one for each furnace, obviously reduces the cost of the apparatus, but where signaling devices, such as the lamps O, are employed I prefer to use a separate relay for each furnace, as with a separate relay for each furnace, one or another of the three signal lamps O for each furnace is constantly illuminated, whereas with the modified arrangement shown in Fig. 10 the various signal lamps O are each illuminated only for brief intervals, regardless of the furnace conditions. With the arrangement shown in Fig. 2, however, each signaling device O, when energized, remains energized until a subsequent measurement of the furnace temperature indicates a change in the latter, whereupon the corresponding indicating device is energized and the latter then remains energized until the meter indicates still another change in the furnace temperature condition. This results from the fact that whenever the armature R of a relay P is shifted into one or another of its different positions the frictional contact between the armature carried contacts $R^5$, $R^6$ and $R^7$, and the corresponding spring contacts $S'$, $S^2$ and $S^3$ insures that the perfectly balanced armature R of the relay will remain in that position until the armature is positively shifted by the energization of a different electromagnet from that which brought the armature into said position. The relative form and arrangement of the armature and electromagnets is such that if the furnace temperature changes from above measurements, the armature R will shift accordingly without stopping in the intermediate position.

While in accordance with the provisions of the statutes I have illustrated and described the best forms of my invention now known to me, it will be apparent to those skilled in the art that many changes in construction and arrangement of the apparatus disclosed may be made without departing from the spirit of the invention set forth in the annexed claims, and that certain features of my invention may sometimes be used with advantage without a corresponding use of other features.

Having now described my invention, what I claim as new and desire to secure by Letters Patent, is:

1. In a furnace system comprising a plurality of furnace units and a thermo-electric device for and responsive to the temperature of each furnace unit, the combination therewith of a selective relay for each furnace, a meter controlled by the respective thermo-electric devices and controlling the corresponding relays and time controlled switching mechanism for successively connecting the meter with the thermo-electric device and relay for each of the plurality of furnaces, and means actuated by each relay for establishing one electrical circuit when the corresponding furnace temperature is below a predetermined temperature, and a second circuit when the furnace temperature exceeds said predetermined temperature, and a third circuit when said temperature is normal.

2. In a temperature control system, the combination with a plurality of units, each unit comprising a source of heat, a temperature responsive device, a plurality of operating circuits, and a separate electrically controlled device in each operating circuit, of means including a relay for selectively controlling said operating circuits, said relay being arranged to remain in any position until re-energized, said selecting means being actuated by the respective responsive devices, and means common to all of said units for selectively connecting said units to said controlling means, whereby one of said operating circuits is closed to actuate an electrically controlled device.

3. In a temperature control system, the combination with a plurality of units, each unit comprising a source of heat, a temperature responsive device, a plurality of operating circuits, and a separate electrically controlled device in each operating circuit, of means including a plurality of relays for selectively controlling said operating circuits, said relays being respectively arranged to remain in any position until re-energized, said selecting means being actuated by the respective responsive devices, and means common to all of said units for selectively connecting said units to said controlling means, whereby one of said operating circuits is closed to actuate an electrically controlled device.

4. In a temperature control system, the combination with a plurality of units, each unit comprising a source of heat, a thermo-couple, a plurality of operating circuits, and an electrically controlled device in each operating circuit, of means including a relay for selectively controlling said operating circuits, said means being controlled by the respective thermo-couples, and said relay being arranged to remain in any position until re-energized, and means for selectively connecting said units to said controlling means.

5. In a temperature control system, the combination with a plurality of units, each unit comprising a source of heat, a thermo-couple, a plurality of operating circuits, and an electrically controlled device in each operating circuit, and selective means cooperating with said units and controlled by the respective thermo-couples for closing an operating circuit of each unit, when the temperature of said source rises above a predetermined temperature, and for closing another operating circuit of each unit when the temperature falls below said predetermined temperature, and for closing a third operating circuit of each unit when the temperature of said source is the normal predetermined temperature, whereby the corresponding electrically controlled devices in the respective closed circuits are caused to function.

6. In a temperature control system for furnaces, the combination of a plurality of furnaces, three operating circuits arranged in conjunction with each furnace, electrically controlled devices in the respective circuits, a temperature responsive device for each furnace, selecting means controlled by said responsive devices, and means for successively connecting said responsive devices to said selecting means, said selecting means being arranged to close one operating circuit for each furnace in accordance with one predetermined furnace condition, to close a second operating circuit for each furnace for another predetermined condition, and to close the third operating circuit for each furnace for a third predetermined furnace condition, whereby different electrically controlled devices are actuated for different furnace conditions.

7. In a temperature control system for furnaces, the combination of a plurality of furnaces, three operating circuits arranged in conjunction with each furnace, electrically actuated signals in the respective circuits, a temperature responsive device for each furnace, selecting means controlled by said responsive devices, and means for successively connecting said responsive devices to said selecting means, said selecting means being arranged to close one operating circuit for each furnace in accordance with one predetermined furnace condition to display one signal, to close a second operating circuit for each furnace for another predetermined furnace condition to display another signal, and to close a third operating circuit for each furnace for a third predetermined furnace condition to display a third signal.

8. The combination with a temperature responsive device, of a galvanometer for indicating the temperature of said device, a group of signal lamps for indicating the temperature of said device, and means responsive to changes in temperature of said device controlling said lamps individually.

9. The combination with a plurality of temperature responsive devices, of means for indicating temperature thereof, signaling means for each of said temperature responsive devices, and switching structure for bringing said signaling means successively into operative relation and said temperature responsive devices into cooperation with said indicating means.

10. The combination with a plurality of temperature responsive devices, of means for indicating temperature thereof, a group of signal lamps for each of said temperature responsive devices, switching means for bringing said groups of lamps successively into operative relation, and switching means for bringing said temperature responsive devices into cooperation with said indicating means.

11. The combination with a plurality of heat responsive devices, of means for making indications respecting temperature thereof, a plurality of signal lamps, and means for bringing said temperature responsive devices successively into cooperation with said indicating means.

12. The combination with a plurality of temperature responsive devices, of galvanometric means the extent of whose deflections is a measure of the temperatures of said devices, a group of signal lamps for each of said devices, and a switch controlling operation of each of said groups of lamps.

13. The combination with a plurality of temperature responsive devices, of means for indicating the temperatures thereof, a switch for each of said devices for bringing the same into cooperative relation with said means, a group of signal lamps for each of said devices, and a switch for each of said groups of signal lamps for bringing the same into cooperative relation with said devices.

14. The combination with a plurality of temperature responsive devices, of means for indicating the temperatures thereof, a group of signal lamps for each of said devices, switches for each of said temperature responsive devices and each of said groups of lamps, and means operating said switches for bringing said devices successively into cooperation with its corresponding group of signal lamps and said indicating means simultaneously.

15. The combination with a plurality of temperature responsive devices, of means for indicating the temperatures thereof, a group of signal lamps for each of said temperature responsive devices, and switching mechanism for periodically bringing said groups of lamps and said devices into co-operative relation.

16. The combination with a plurality of temperature responsive devices, of means for indicating the temperatures thereof, a group of lamps for each of said devices, means for periodically bringing said devices into operative relation with said indicating means and said groups of lamps into operative relation with said devices, and switching mechanism for each of said groups of lamps operated in response to changes in temperature of said devices controlling the lamps of a group individually.

17. The combination with a plurality of temperature responsive devices, of means for indicating the temperatures thereof, a group of signal lamps for each of said devices, switching mechanism for each of said groups of lamps, each switching mechanism responsive to changes in temperature of one of said devices and controlling the lamps of the corresponding group individually, and means for periodically associating one of said devices with one of said groups of lamps and said indicating means.

18. The combination with a plurality of temperature responsive devices, of a movable element responsive to temperature changes of said responsive devices, groups of electrically operated devices for indicating the temperature of the respective responsive devices, and means whereby said movable element causes operation of the respective group devices in accordance with the temperature surrounding the respective responsive devices.

RICHARD P. BROWN.